(12) United States Patent
Takashima et al.

(10) Patent No.: US 11,757,340 B2
(45) Date of Patent: Sep. 12, 2023

(54) ROTATING ELECTRIC MACHINE

(71) Applicant: Mitsubishi Electric Corporation, Tokyo (JP)

(72) Inventors: Hiroyuki Takashima, Tokyo (JP); Masatsugu Nakano, Tokyo (JP); Kosho Yamane, Tokyo (JP); Masaya Inoue, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 166 days.

(21) Appl. No.: 16/992,632

(22) Filed: Aug. 13, 2020

(65) Prior Publication Data
US 2021/0057975 A1    Feb. 25, 2021

(30) Foreign Application Priority Data

Aug. 19, 2019   (JP) ................. 2019-149608

(51) Int. Cl.
*H02K 29/03*      (2006.01)
*H02K 1/18*       (2006.01)
(Continued)

(52) U.S. Cl.
CPC ............. *H02K 29/03* (2013.01); *H02K 1/185* (2013.01); *H02K 1/276* (2013.01); *H02K 7/075* (2013.01);
(Continued)

(58) Field of Classification Search
CPC ........ H02K 1/185; H02K 1/276; H02K 21/14; H02K 2201/06; H02K 2213/03;
(Continued)

(56) References Cited

U.S. PATENT DOCUMENTS

| 6,590,312 B1 * | 7/2003 | Seguchi .................. B60K 6/40 |
| | | 310/156.01 |
| 7,342,338 B2 * | 3/2008 | Miyazaki ............... H02K 1/278 |
| | | 310/156.47 |

(Continued)

FOREIGN PATENT DOCUMENTS

| JP | 11-332010 A | 11/1999 |
| JP | 2006-230189 A | 8/2006 |

(Continued)

OTHER PUBLICATIONS

Notice of Reasons for Refusal dated Oct. 27, 2020 from the Japanese Patent Office in Application No. 2019-149608.

*Primary Examiner* — Alex W Mok
(74) *Attorney, Agent, or Firm* — Sughrue Mion, PLLC; Richard C. Turner

(57) ABSTRACT

Provided is a rotating electric machine capable of reducing oscillations and noise generated in the rotating electric machine. The rotating electric machine includes a stator, a rotor, and a frame. The rotor includes: a rotor core; and a plurality of permanent magnets, and the rotor is divided into a plurality of blocks. The plurality of blocks include: a skew-angle-increasing pair of blocks; and a skew-angle-decreasing pair of blocks. The frame includes: a body portion configured to hold the stator; and a flange portion, which projects outward from the body portion, and the body portion has a thickness that changes from one end to another end of the body portion in an axial direction thereof.

13 Claims, 13 Drawing Sheets

(51) Int. Cl.
 *H02K 1/27* (2022.01)
 *H02K 21/14* (2006.01)
 *H02K 7/075* (2006.01)
 *H02K 7/08* (2006.01)
 *H02K 1/276* (2022.01)

(52) U.S. Cl.
 CPC ............. *H02K 7/083* (2013.01); *H02K 21/14* (2013.01); *H02K 2201/06* (2013.01); *H02K 2213/03* (2013.01)

(58) Field of Classification Search
 CPC .......... H02K 29/03; H02K 5/24; H02K 7/075; H02K 7/083
 USPC ........................................................... 310/51
 See application file for complete search history.

(56) References Cited

U.S. PATENT DOCUMENTS

| | | | | |
|---|---|---|---|---|
| 7,518,277 B2* | 4/2009 | Nemoto | ................ | H02K 29/03 310/156.47 |
| 7,541,710 B2* | 6/2009 | Nemoto | ................... | H02K 1/27 310/156.47 |
| 7,816,822 B2* | 10/2010 | Nashiki | ................ | H02K 1/2773 310/257 |
| 8,653,710 B2* | 2/2014 | Takahashi | .............. | H02K 1/276 310/182 |
| 9,343,933 B2* | 5/2016 | Isoda | ................... | H02K 1/2766 |
| 9,343,937 B2* | 5/2016 | Nakazono | ................ | H02K 1/28 |
| 9,543,792 B2* | 1/2017 | Takahashi | ............ | H02K 21/145 |
| 2006/0163969 A1* | 7/2006 | Nemoto | ................... | H02K 1/27 310/211 |
| 2007/0205689 A1* | 9/2007 | Nemoto | ................. | H02K 29/03 310/156.53 |
| 2010/0301697 A1* | 12/2010 | Takahashi | ............. | H02K 1/2766 310/156.53 |
| 2011/0309706 A1* | 12/2011 | Takahashi | .............. | H02K 1/276 310/156.53 |
| 2014/0084744 A1* | 3/2014 | Nakazono | ................ | H02K 1/28 310/216.123 |
| 2015/0076940 A1 | 3/2015 | Ohashi et al. | | |
| 2015/0251536 A1* | 9/2015 | Sullivan | ................. | B60K 25/02 248/674 |
| 2019/0260277 A1* | 8/2019 | Ikemoto | ................. | H02K 15/024 |

FOREIGN PATENT DOCUMENTS

| | | |
|---|---|---|
| JP | 2008-131783 A | 6/2008 |
| JP | 2018-057221 A | 4/2018 |
| WO | 2013/164889 A1 | 11/2013 |
| WO | 2018/097193 A1 | 5/2018 |

* cited by examiner

ROTATING ELECTRIC MACHINE

BACKGROUND OF THE INVENTION

1. Field of the Invention

The present invention relates to a rotating electric machine.

2. Description of the Related Art

In the related art, there is known a rotating electric machine including a stator, and a rotor provided to be opposed to the stator. The stator includes a stator core, and a plurality of stator coils, which are provided to the stator core, and are arranged in a circumferential direction of the stator (see Japanese Patent Application Laid-open No. Hei 11-332010, for example).

However, when an electric current is supplied to the stator coils, a magnetomotive force is generated in the stator. When the magnetomotive force is generated in the stator, an electromagnetic excitation force is generated between the stator and the rotor. There has been a problem in that, when the electromagnetic excitation force is generated between the stator and the rotor, oscillations and noise are generated in the rotating electric machine.

SUMMARY OF THE INVENTION

The present invention has been made to solve the above-mentioned problem, and therefore has an object to provide a rotating electric machine capable of reducing oscillations and noise generated in the rotating electric machine.

According to at least one embodiment of the present invention, there is provided a rotating electric machine including a stator, a rotor provided to be opposed to the stator, and a frame configured to hold the stator. The rotor includes: a rotor core; and a plurality of permanent magnets, which are provided in the rotor core, and are arranged in a circumferential direction of the rotor, and the rotor is divided into a plurality of blocks in an axial direction of the rotor. The plurality of blocks include: a skew-angle-increasing pair of blocks, which are a pair of blocks of the plurality of blocks that are adjacent to and shifted from each other in a first direction of the circumferential direction of the rotor from one end to another end of the rotor in the axial direction of the rotor; and a skew-angle-decreasing pair of blocks, which are a pair of blocks of the plurality of blocks that are adjacent to and shifted from each other in a second direction, which is an opposite direction from the first direction, of the circumferential direction of the rotor from the one end to the another end of the rotor in the axial direction of the rotor. The frame includes: a body portion, which is formed into a cylindrical shape, and is configured to hold the stator; and a flange portion, which is provided at an end of the body portion in an axial direction of the body portion, and projects outward from the body portion in a radial direction of the body portion, and the body portion has a thickness that changes from one end to another end of the body portion in the axial direction of the body portion.

According to the rotating electric machine of at least one embodiment of the present invention, it is possible to reduce the oscillations and noise generated in the rotating electric machine.

DESCRIPTION OF THE EMBODIMENTS

First Embodiment

Figure 1:
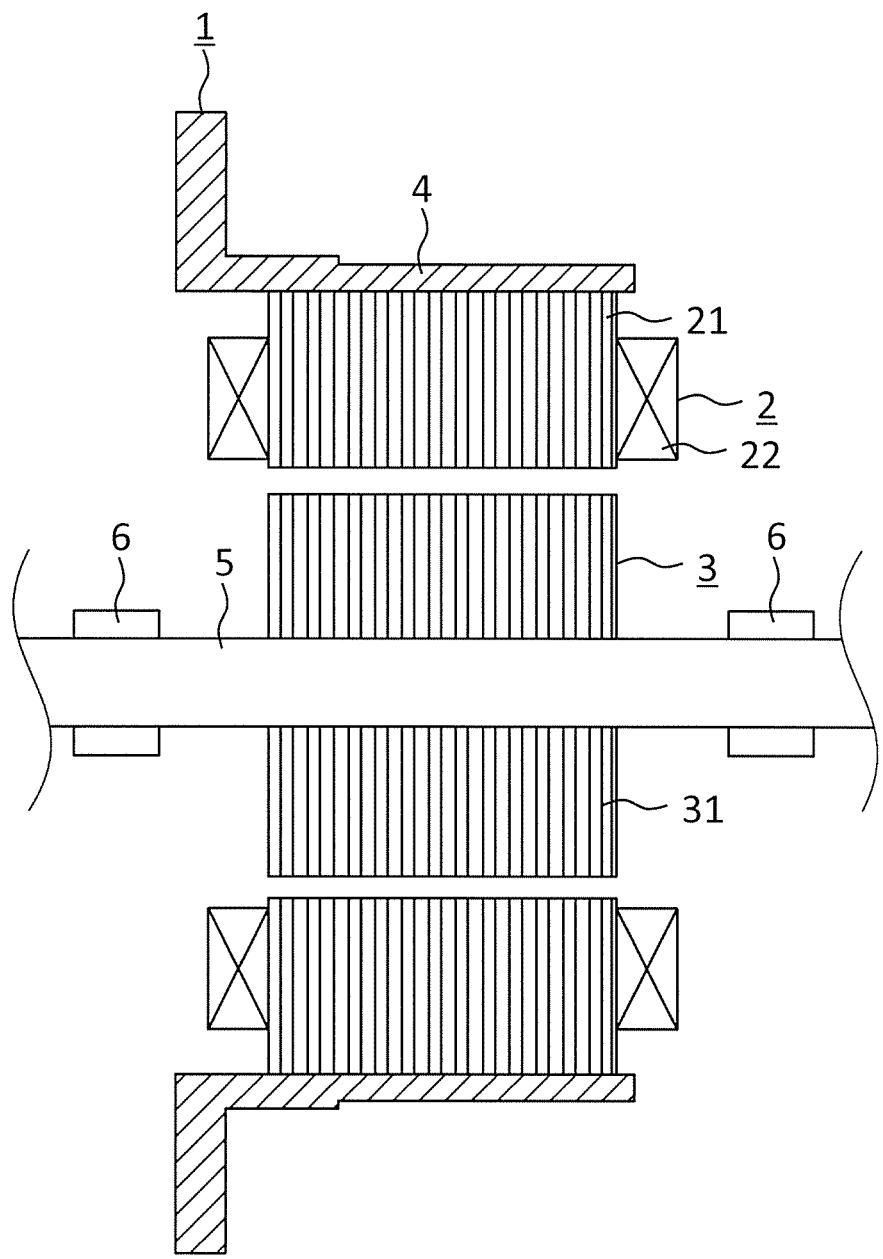
FIG. 1 is an axial sectional view for illustrating a rotating electric machine according to a first embodiment of the present invention.

FIG. 1 is an axial sectional view for illustrating a rotating electric machine according to a first embodiment of the present invention. A rotating electric machine 1 includes a stator 2, a rotor 3 provided to be opposed to the stator 2, a frame 4 configured to hold the stator 2, a rotary shaft 5 configured to support the rotor 3, and a pair of bearings 6 provided to the rotary shaft 5. The pair of bearings 6 are supported by support members (not shown), respectively. The rotary shaft 5 is supported by the support members via the pair of bearings 6.

In this example, an axial direction is defined as an axial direction of the rotor 3, a circumferential direction is defined as a circumferential direction of the rotor 3, and a radial direction is defined as a radial direction of the rotor 3. FIG. 1 is a sectional view obtained by cutting the rotating electric machine 1 in the radial direction. An axial direction of the stator 2 coincides with the axial direction of the rotor 3, a circumferential direction of the stator 2 coincides with the circumferential direction of the rotor 3, and a radial direction of the stator 2 coincides with the radial direction of the rotor 3.

The rotor 3 includes a rotor core 31 having a cylindrical shape, which is provided to the rotary shaft 5. The rotor 3 is opposed to the stator 2 in the radial direction. The rotor 3 is arranged inside the stator 2 in the radial direction. The rotor 3 rotates in the circumferential direction about the rotary shaft 5.

The rotary shaft 5 is arranged to extend in the axial direction. The pair of bearings 6 are provided to the rotary shaft 5 so that the rotor 3 is arranged between the pair of bearings 6 in the axial direction. When the rotary shaft 5 rotates, the rotor 3 rotates in the circumferential direction with respect to the stator 2.

The stator 2 includes a stator core 21, and stator coils 22 provided to the stator core 21. The stator core 21 is formed by laminating a plurality of steel sheets in the axial direction of the stator 2.

Figure 2:
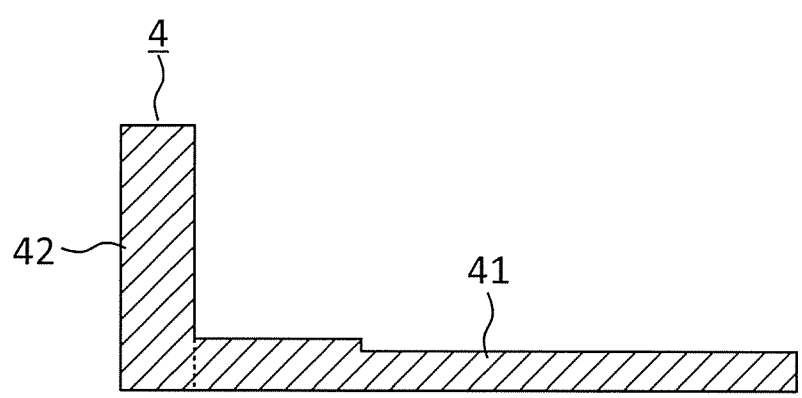
FIG. 2 is an enlarged view for illustrating a main part of a frame of FIG. 1.

FIG. 2 is an enlarged view for illustrating a main part of the frame 4 of FIG. 1. The frame 4 has a body portion 41, which is formed into a cylindrical shape and is configured to hold the stator 2, and a flange portion 42 provided at an end of the body portion 41 in an axial direction of the body portion 41. The flange portion 42 is provided at only one end of the body portion 41. The stator 2 is fitted to the body portion 41. The flange portion 42 projects outward from the body portion 41 in a radial direction of the body portion 41. The axial direction of the body portion 41 coincides with the axial direction of the rotor 3, and the radial direction of the body portion 41 coincides with the radial direction of the rotor 3.

The body portion 41 has a thickness that changes from the one end to the other end of the body portion 41 in the axial direction of the body portion 41. In other words, the shape of the body portion 41 is a shape in which the thickness of the body portion 41 is uneven in the axial direction of the body portion 41. To the frame 4, a cooling device configured to cool the stator 2 may be arranged.

Figure 3:
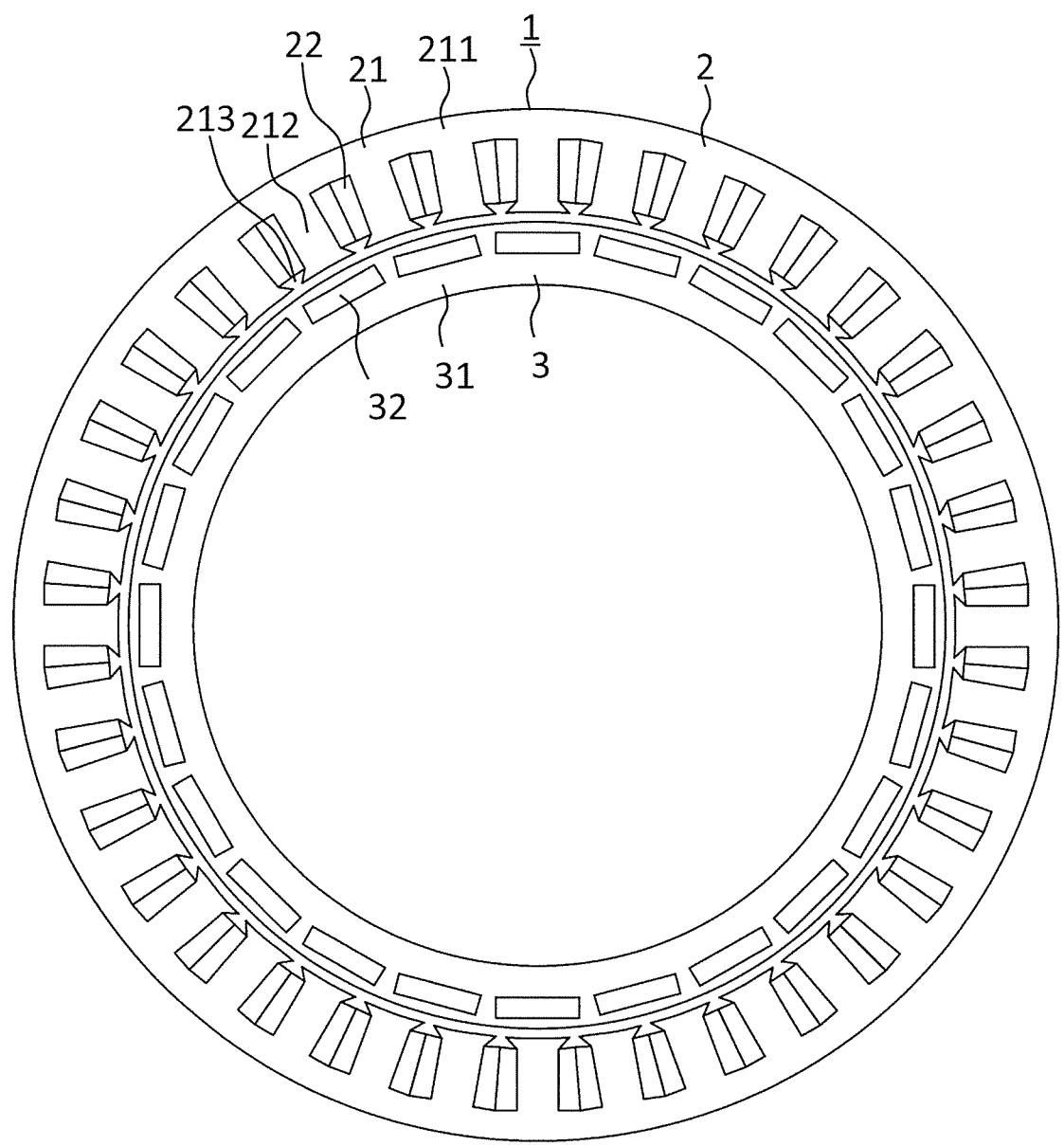
FIG. 3 is a radial sectional view for illustrating a stator and a rotor of FIG. 1.

FIG. 3 is a radial sectional view for illustrating the stator 2 and the rotor 3 of FIG. 1. The stator core 21 includes a core back portion 211 having a cylindrical shape, and a plurality of tooth portions 212, which are provided to the core back portion 211, and are arranged in the circumferential direction of the stator 2. Each of the plurality of tooth portions 212 projects inward from the core back portion 211 in the radial direction of the stator 2. The plurality of tooth portions 212 are arranged at equal intervals in the circumferential direction of the stator 2.

Between each pair of tooth portions 212 of the stator core that are adjacent to each other in the circumferential direction of the stator 2, a slot portion 213 is formed. The stator coils 22 are inserted in the slot portions 213. The number of slot portions 213 of the stator 2 is the number of slots.

The rotor 3 includes a plurality of permanent magnets 32 provided in the rotor core 31. The plurality of permanent magnets 32 are arranged in the circumferential direction. In the rotor core 31, a plurality of magnet insertion holes, in which the plurality of permanent magnets 32 are inserted in a one-to-one correspondence, are formed. Therefore, the permanent magnets 32 are embedded in the rotor core 31. The permanent magnets 32 form magnet poles of the rotor 3. The number of magnet poles of the rotor 3 is defined as the "number of poles".

The number of poles is represented by N, and the number of slots is represented by M. In the rotating electric machine 1, N=24 and M=36 are satisfied. A ratio between the number N of poles and the number M of slots is N:M=2:3. When an electric current is supplied to the stator coils 22, a magnetomotive force is generated in the stator coils 22. Harmonic components of the magnetomotive force generated in the stator coils 22 include large amounts of fifth-ordered electrical angle components and seventh-ordered electrical angle components. Therefore, of electromagnetic excitation forces generated between the stator 2 and the rotor 3, an amount of electromagnetic excitation forces having a period of 60° in electrical angle becomes larger. As a result, of oscillations generated in the stator 2, oscillations having a period of 60° in electrical angle become larger. In other words, of the oscillations generated in the stator 2, sixth-ordered electrical angle oscillations become larger.

When the rotating electric machine 1 is downsized, magnetic saturation occurs in the stator core 21 and the rotor core 31 in some cases. In this case, magnetic fluxes passing through a gap between the stator 2 and the rotor 3 contain harmonic components. As a result, a magnetic flux density in the gap between the stator 2 and the rotor 3 contains fifth-ordered electrical angle components and seventh-ordered electrical angle components. Consequently, of the oscillations generated in the stator 2, sixth-ordered electrical angle oscillations become larger.

Figure 4:
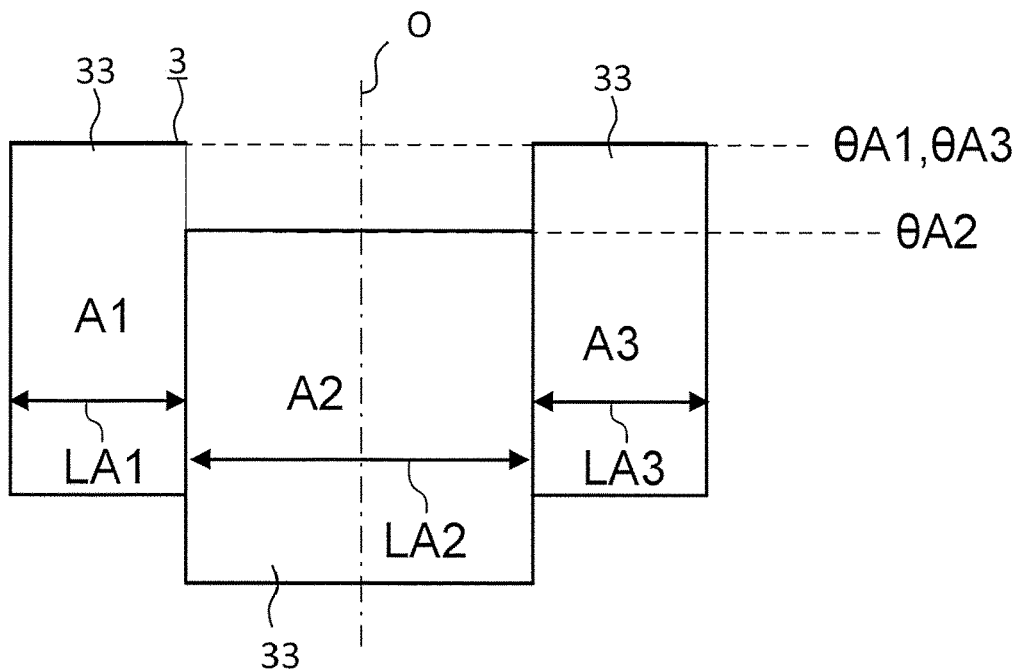
FIG. 4 is a diagram for illustrating the rotor of FIG. 1.

FIG. 4 is a diagram for illustrating the rotor 3 of FIG. 1. The rotor 3 is divided into a plurality of blocks 33 in the axial direction. Three blocks 33 are arranged in the axial direction. The three blocks 33 are defined as a first block A1, a second block A2, and a third block A3 in order from one end to the other end of the rotor 3 in the axial direction. FIG. 4 shows respective shift angles of the three blocks 33 in the circumferential direction.

A length of the first block A1 in the axial direction is represented by LA1. A length of the second block A2 in the axial direction is represented by LA2. A length of the third block A3 in the axial direction is represented by LA3. In this example, LA1=LA3, and LA2=2×LA1.

The first block A1 and the second block A2 are arranged to be shifted from each other in the circumferential direction. The second block A2 and the third block A3 are arranged to be shifted from each other in the circumferential direction. One direction of the circumferential direction is defined as a first direction, and the other direction of the circumferential direction is defined as a second direction. Therefore, the second direction is the opposite direction from the first direction. The second block A2 is arranged to be shifted from the first block A1 in the first direction of the circumferential direction, and the third block A3 is arranged to be shifted from the second block A2 in the second direction of the circumferential direction.

A pair of blocks 33 that are adjacent to, and shifted in the first direction of the circumferential direction from, each other from the one end to the other end of the rotor 3 in the axial direction are defined as a "skew-angle-increasing pair of blocks". A pair of blocks 33 that are adjacent to, and shifted in the second direction of the circumferential direction from, each other from the one end to the other end of the rotor 3 in the axial direction are defined as a "skew-angle-decreasing pair of blocks". The first block A1 and the second block A2 are a skew-angle-increasing pair of blocks, and the second block A2 and the third block A3 are a skew-angle-decreasing pair of blocks. Therefore, the three blocks 33 include one skew-angle-increasing pair of blocks and one skew-angle-decreasing pair of blocks.

A shift angle of the first block A1 with respect to a reference position of the blocks 33 in the circumferential direction is represented by $\theta A1$. A shift angle of the second block A2 with respect to the reference position of the blocks 33 in the circumferential direction is represented by $\theta A2$. A shift angle of the third block A3 with respect to the reference position of the blocks 33 in the circumferential direction is represented by $\theta A3$.

In the first embodiment, a position of the first block A1 and a position of the third block A3 are the reference position of the blocks 33. Therefore, $\theta A1 = \theta A3 = 0°$. The second block A2 is shifted by 30° from the reference position of the blocks 33 in the circumferential direction. Therefore, $\theta A2 = 30°$. Here, the shift angle $\theta A1$, the shift angle $\theta A2$, and the shift angle $\theta A3$ are electrical angles. In this example, $\theta A1 = \theta A3 = 0°$. However, the present invention is not limited thereto, and the shift angle $\theta A1$ and the shift angle $\theta A3$ may be another angle. Also in this case, the shift angle $\theta A2$ is shifted by 30° from the shift angle $\theta A1$ and the shift angle $\theta A3$ in the circumferential direction.

Figure 5:
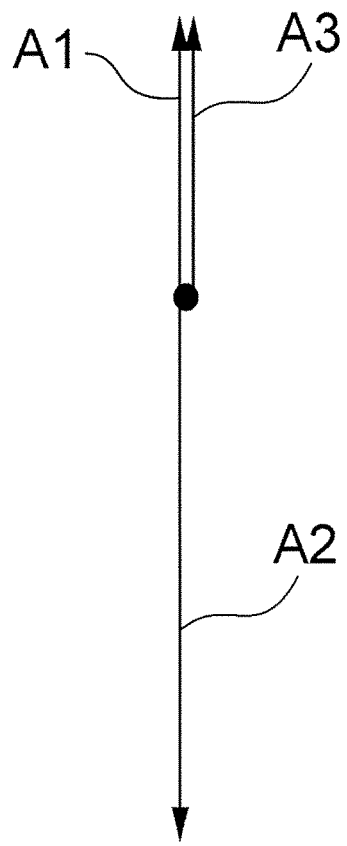
FIG. 5 is a diagram for illustrating electromagnetic excitation forces of sixth-ordered electric angle generated in respective blocks of FIG. 4.

FIG. 5 is a diagram for illustrating electromagnetic excitation forces of sixth-ordered electric angle generated in the respective blocks 33 of FIG. 4. The electromagnetic excitation forces of sixth-ordered electric angle generated in the rotor 3 are electromagnetic excitation forces having a period of 60° in electrical angle. Therefore, phases of the electromagnetic excitation forces of sixth-ordered electric angle generated in the first block A1 and the second block A2, which are shifted by 30° in electrical angle, are phases that are reversed from each other. In other words, the electromagnetic excitation forces of sixth-ordered electric angle generated in the first block A1 and the second block A2, respectively, have a phase difference of 180°. The electromagnetic excitation forces of sixth-ordered electric angle generated in the second block A2 and the third block A3, respectively, also have a phase difference of 180°.

Magnitudes of the electromagnetic excitation forces of sixth-ordered electric angle generated in the respective blocks 33 are proportional to the lengths of the blocks 33 in the axial direction. FIG. 5 shows angles and the magnitudes of the electromagnetic excitation forces of sixth-ordered electric angle generated in the first block A1, the second block A2, and the third block A3 through use of vectors.

The electromagnetic excitation force of sixth-ordered electric angle generated in the first block A1 and the electromagnetic excitation force of sixth-ordered electric angle generated in the third block A3 have the same phase and the same magnitude. The magnitude of the electromagnetic excitation force of sixth-ordered electric angle generated in the second block A2 is twice the magnitude of the electromagnetic excitation force of sixth-ordered electric angle generated in each of the first block A1 and the third block A3. A phase of the electromagnetic excitation force of sixth-ordered electric angle generated in the second block A2 is shifted by 180° from a phase of the electromagnetic excitation force of sixth-ordered electric angle generated in each of the first block A1 and the third block A3. As illustrated in FIG. 5, a sum of a vector indicating the electromagnetic excitation force of sixth-ordered electric angle generated in the first block A1, a vector indicating the electromagnetic excitation force of sixth-ordered electric angle generated in the second block A2, and a vector indicating the electromagnetic excitation force of sixth-ordered electric angle generated in the third block A3 is a zero vector. Therefore, the electromagnetic excitation forces of sixth-ordered electric angle generated in the first block A1, the second block A2, and the third block A3 are cancelled out. As a result, the electromagnetic excitation forces of sixth-ordered electric angle are reduced.

As illustrated in FIG. 4, a plane that is perpendicular to the axial direction and passes through the center of the rotor 3 in the axial direction is defined as a center plane O. In a portion of the rotor 3 on one side of the center plane O in the axial direction, a sum of vectors indicating generated electromagnetic excitation forces of sixth-ordered electric angle is a zero vector. Similarly, in a portion of the rotor 3 on the other side of the center plane O in the axial direction, a sum of vectors indicating generated electromagnetic excitation forces of sixth-ordered electric angle is a zero vector.

In other words, between the portion of the rotor 3 on the one side of the center plane O in the axial direction and the portion of the rotor 3 on the other side of the center plane O in the axial direction, the generated electromagnetic excitation forces of sixth-ordered electric angle match. As a result, oscillations of the rotating electric machine 1 are further suppressed.

Figure 6:
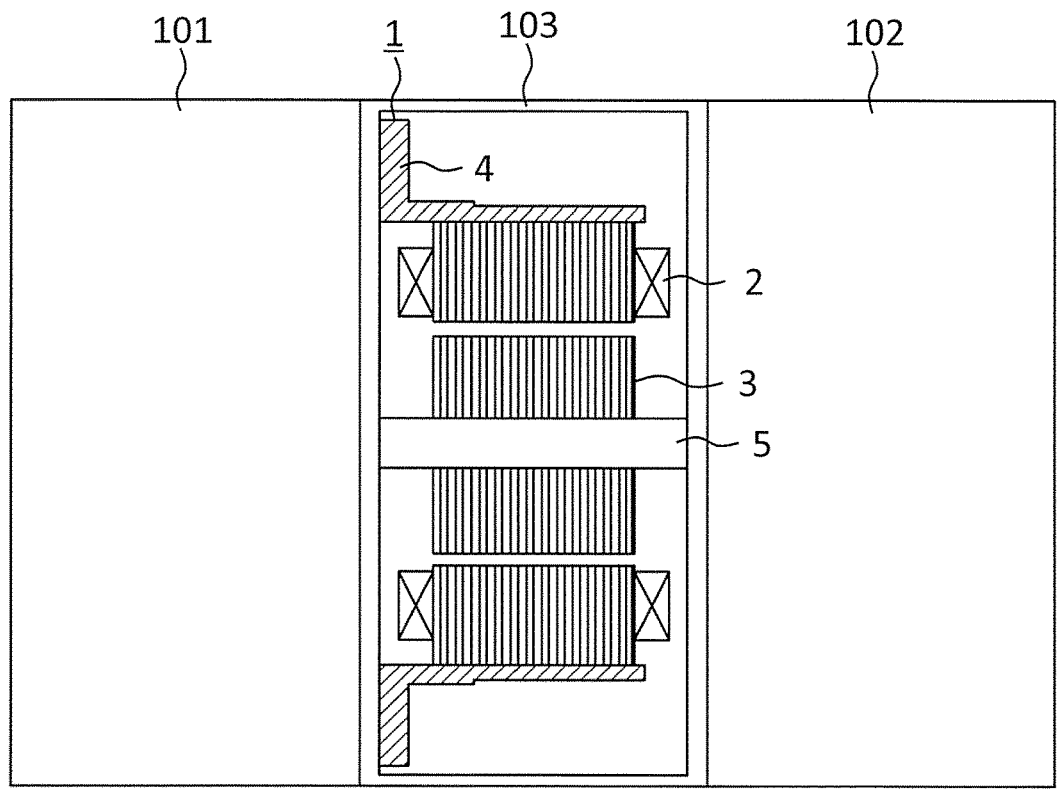
FIG. 6 is a diagram for illustrating arrangement of the rotating electric machine when the rotating electric machine is mounted on a vehicle.

FIG. 6 is a diagram for illustrating arrangement of the rotating electric machine 1 when the rotating electric machine 1 is mounted on a vehicle. The rotary shaft 5 is arranged on the same axis as that of a crank shaft (not shown) included in an engine 101. The frame 4 is cantilevered to a housing 103, which is provided between the engine 101 and a transmission 102. The housing 103 is a mounting target member to which the flange portion 42 is mounted. The rotary shaft 5 is directly connected to the crank shaft.

Figure 7:
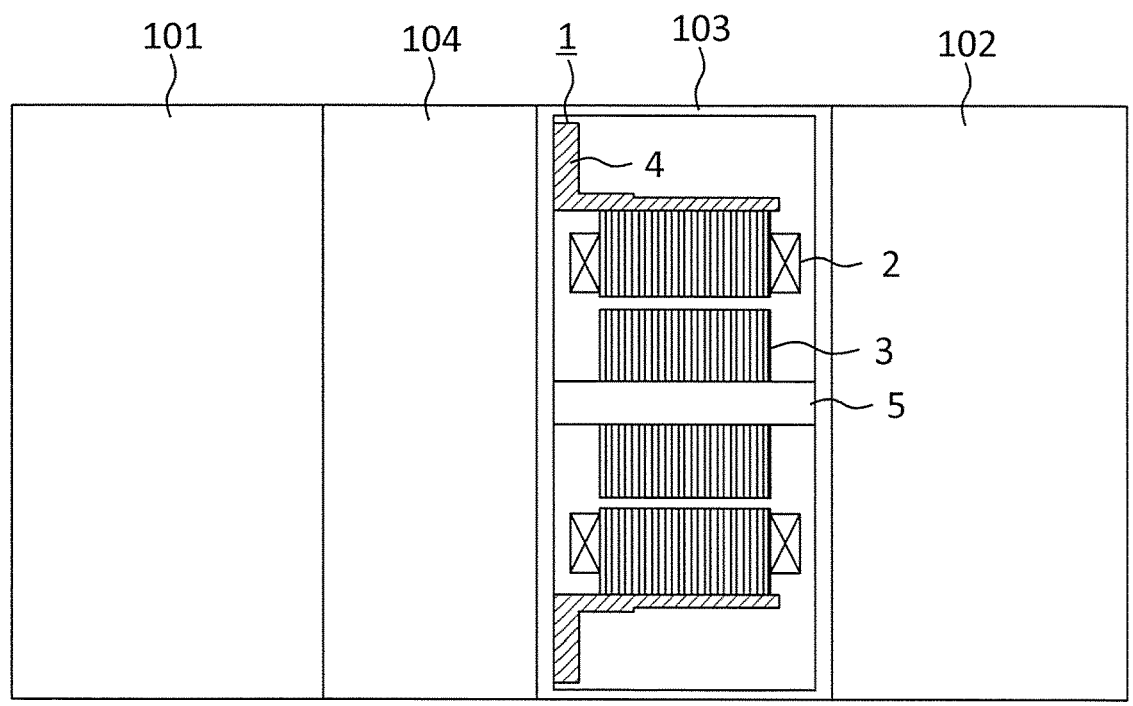
FIG. 7 is a diagram for illustrating a modification example of the arrangement of the rotating electric machine of FIG. 6.

FIG. 7 is a diagram for illustrating a modification example of the arrangement of the rotating electric machine 1 of FIG. 6. The rotary shaft 5 may be connected to the crank shaft via a transmission system 104, which is provided to the crank shaft.

Figure 8:
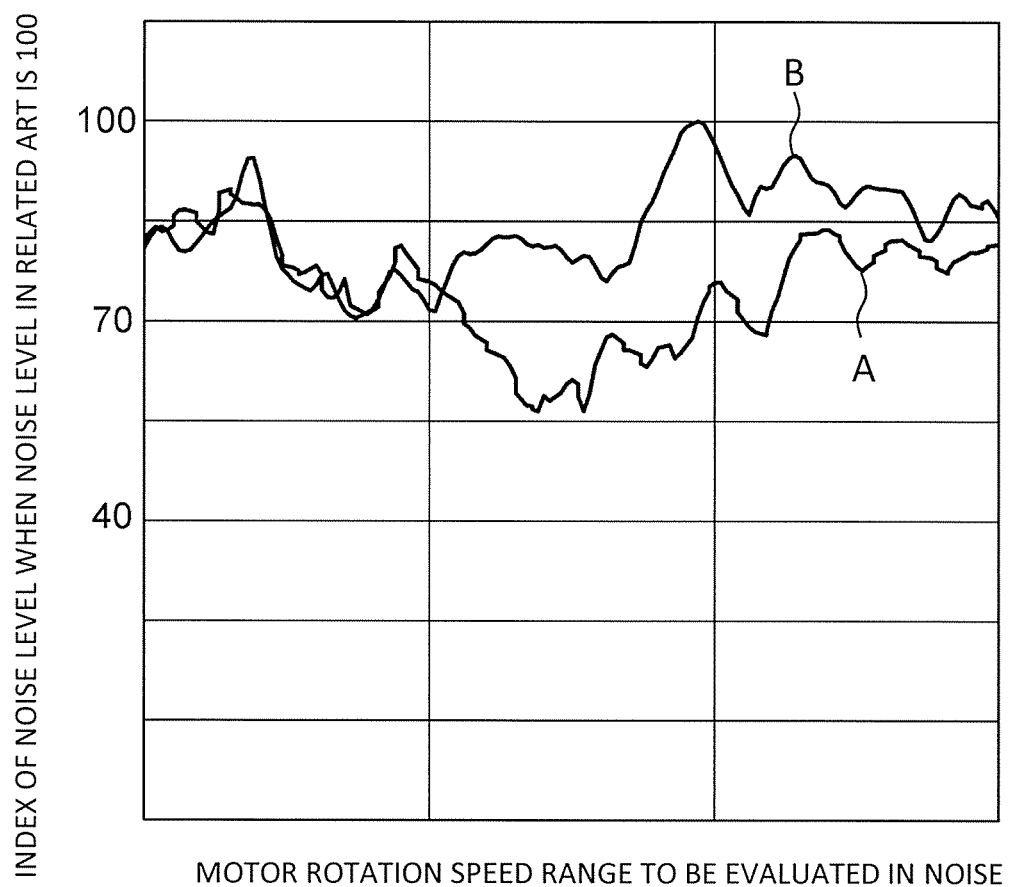
FIG. 8 is a graph for showing noise measurement results obtained by measuring noise generated by the rotating electric machine of FIG. 1.

FIG. 8 is a graph for showing noise measurement results obtained by measuring noise generated by the rotating electric machine 1 of FIG. 1. In the rotating electric machine 1, an electromagnetic excitation force generated in the gap between the stator 2 and the rotor 3 generates an electromagnetic excitation force in the stator 2 in the radial direction. The electromagnetic excitation force generated in the stator 2 generates oscillations in the frame 4, which is configured to hold the stator 2. The oscillations generated in the frame 4 generate noise from the rotating electric machine 1. The electromagnetic excitation force generated in the stator 2 in the radial direction contains various temporal components. In a two-pole three-slot concentrated winding permanent magnet rotating electric machine, the electromagnetic excitation force generated in the stator 2 in the radial direction contains an electromagnetic excitation force having a mode zeroth-ordered deformation and a sixth-ordered temporal component of the stator 2. Here, a period of 360° in mechanical angle is defined as a first order, and a period of 360° in electrical angle is defined as a first order.

FIG. 8 shows a noise A generated by the rotating electric machine 1 according to the first embodiment, and a noise B generated by the rotating electric machine in the related art. FIG. 8 shows the noise measurement results obtained when a motor is used as the rotating electric machine 1. In a rotation speed range in which the rotating electric machine 1 is evaluated, as compared to the noise B generated by the rotating electric machine in the related art, the noise A generated by the rotating electric machine 1 according to the first embodiment is significantly reduced.

Figure 9:
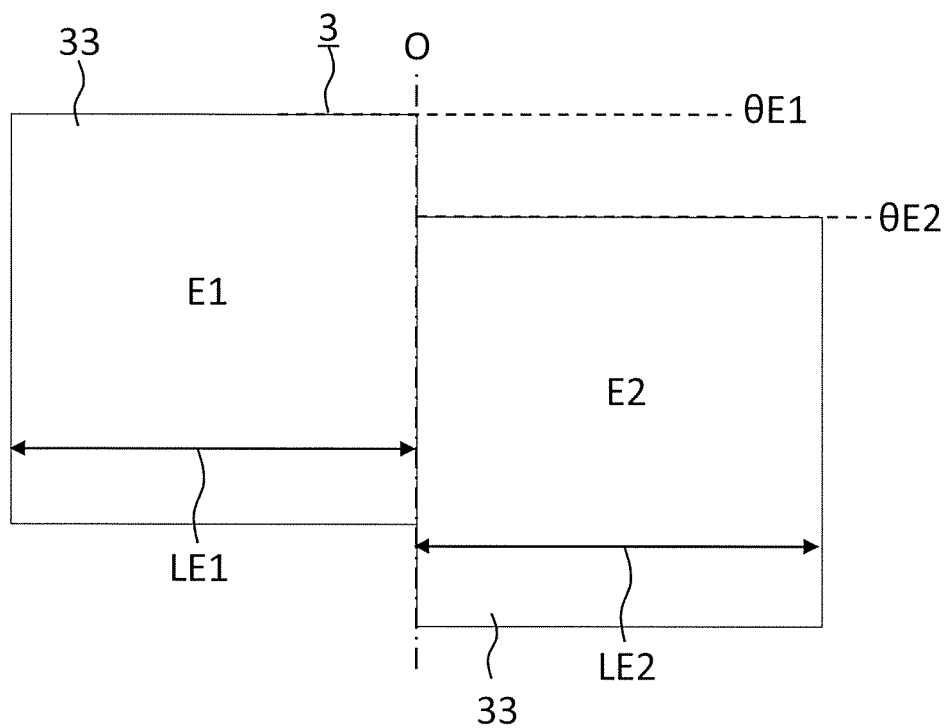
FIG. 9 is a diagram for illustrating a rotor in a comparative example of the present invention.

FIG. 9 is a diagram for illustrating the rotor 3 in a comparative example of the present invention. The rotor 3 in the comparative example is divided into two blocks 33 in the axial direction. The two blocks 33 are arranged in the axial direction. The two blocks 33 are defined as a first block E1 and a second block E2 in order from one end to the other end of the rotor 3 in the axial direction. FIG. 9 shows respective shift angles of the two blocks 33 in the circumferential direction.

A length of the first block E1 in the axial direction is represented by LE1. A length of the second block E2 in the axial direction is represented by LE2. In FIG. 9, LE1=LE2.

The first block E1 and the second block E2 are arranged to be shifted from each other in the circumferential direction. A shift angle of the first block E1 with respect to the reference position of the blocks 33 in the circumferential direction is represented by θE1. A shift angle of the second block E2 with respect to the reference position of the blocks 33 in the circumferential direction is represented by θE2. In FIG. 9, θE1=0, and θE2=30°.

The electromagnetic excitation forces of sixth-ordered electric angle generated in the rotor 3 are electromagnetic excitation forces having a period of 60° in electrical angle. Therefore, phases of the electromagnetic excitation forces generated in the first block E1 and the second block E2, which are shifted by 30° in electrical angle, are phases that are reversed from each other. In other words, the electromagnetic excitation forces of sixth-ordered electric angle generated in the first block E1 and the second block E2, respectively, have a phase difference of 180°.

A sum of a vector indicating the electromagnetic excitation force of sixth-ordered electric angle generated in the first block E1 and a vector indicating the electromagnetic excitation force of sixth-ordered electric angle generated in the second block E2 is a zero vector. Therefore, the electromagnetic excitation forces of sixth-ordered electric angle generated in the first block E1 and the second block E2 are cancelled out. As a result, the electromagnetic excitation forces of sixth-ordered electric angle are reduced. However, in each of a portion of the rotor 3 on one side of the center plane O in the axial direction and a portion of the rotor 3 on the other side of the center plane O in the axial direction, a sum of vectors of the electromagnetic excitation forces of sixth-ordered electric angle is not a zero vector.

Figure 10:
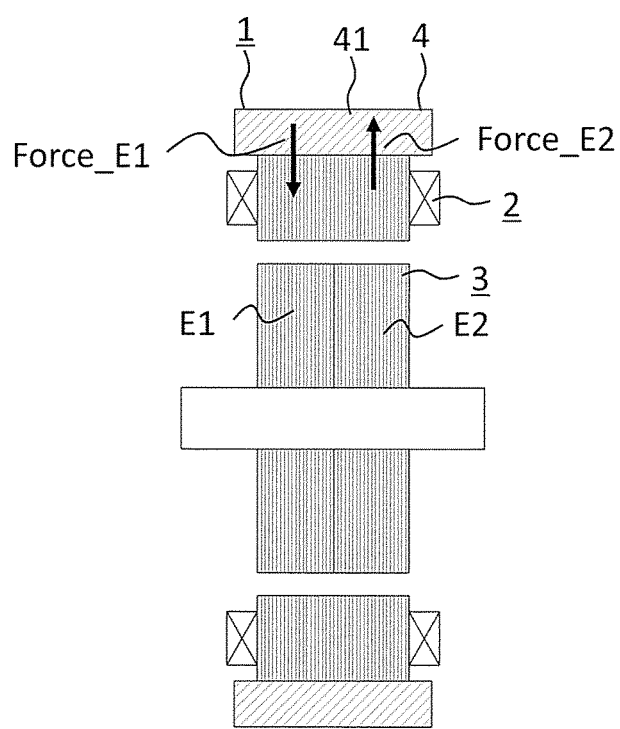
FIG. 10 is a view for illustrating electromagnetic excitation forces generated in the rotor of a rotating electric machine according to the comparative example.

FIG. 10 is a view for illustrating electromagnetic excitation forces generated in the rotor 3 of the rotating electric machine 1 according to the comparative example. In FIG. 10, the body portion 41 has a thickness that is constant from one end to the other end of the body portion 41 in the axial direction of the body portion 41. In FIG. 10, no flange portion is illustrated, but flange portions are provided at both ends of the body portion 41 in the axial direction of the body portion 41.

An electromagnetic excitation force of sixth-ordered electric angle generated in the first block E1 is represented by Force_E1, and an electromagnetic excitation force of sixth-ordered electric angle generated in the second block E2 is represented by Force_E2. The electromagnetic excitation force Force_E1 and the electromagnetic excitation force Force_E2 have phases that are reversed from each other, and have the same magnitude. Therefore, with the rotating electric machine 1 illustrated in FIG. 10, deformation of the stator 2 is suppressed.

Figure 11:
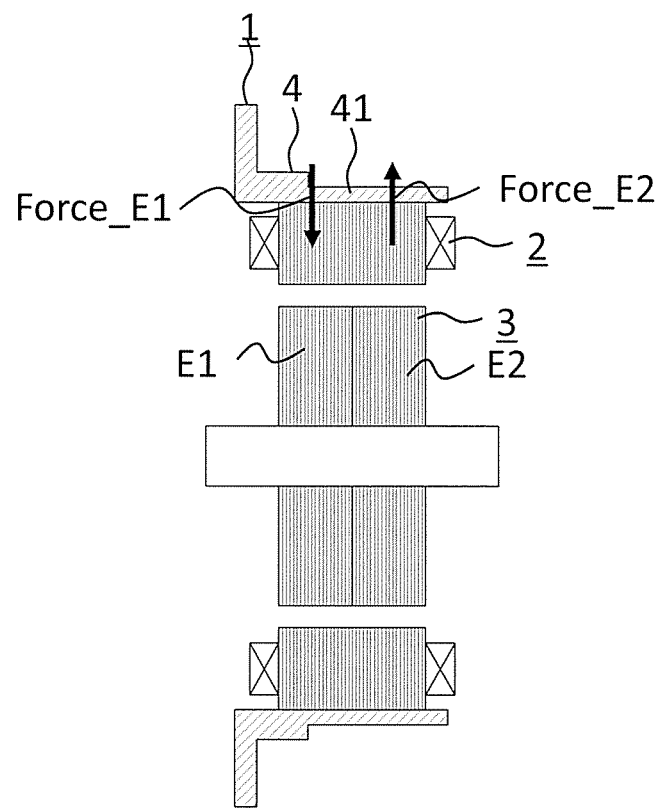
FIG. 11 is a view for illustrating electromagnetic excitation forces generated in a rotor of a rotating electric machine according to another comparative example.

FIG. 11 is a view for illustrating electromagnetic excitation forces generated in a rotor 3 of a rotating electric machine 1 according to another comparative example. In FIG. 11, a thickness of the body portion 41 changes from the one end to the other end of the body portion 41 in the axial direction of the body portion 41. In other words, the body portion 41 partially includes a thin portion. Deformation of the stator 2 by the electromagnetic excitation force Force_E1 and the electromagnetic excitation force Force_E2 becomes larger. As a result, oscillations of the rotating electric machine 1 are increased.

Figure 12:
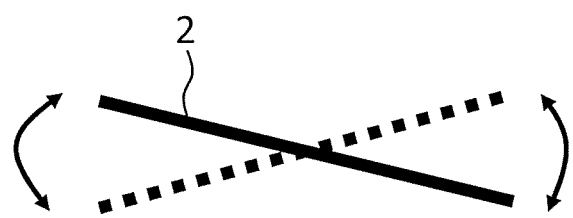
FIG. 12 is a diagram for illustrating deformation of a stator by the electromagnetic excitation forces of FIG. 11.
Figure 13:
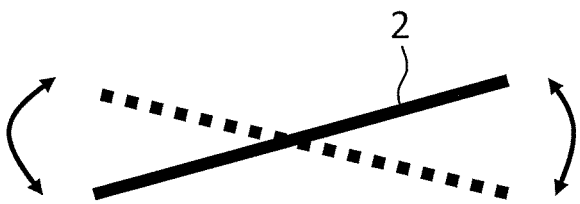
FIG. 13 is a diagram for illustrating deformation of the stator by the electromagnetic excitation forces of FIG. 11.

Further, in FIG. 11, a flange portion is arranged at only one end of the body portion 41 in the axial direction of the body portion 41. Therefore, the other end of the body portion 41 in the axial direction of the body portion 41 is not fixed to the housing 103. In this case, deformation of the stator 2 by the electromagnetic excitation force Force_E1 and the electromagnetic excitation force Force_E2 become even larger. As a result, oscillations of the rotating electric machine 1 are further increased. In particular, in a portion of the body portion 41 on which the electromagnetic excitation force Force_E2 acts, a flange portion is not provided, and in the portion of the body portion 41 on which the electromagnetic excitation force Force_E2 acts, the thin portion is contained. Therefore, deformation of the stator 2 by the electromagnetic excitation force Force_E2 becomes even larger. As a result, the oscillations of the rotating electric machine 1 are further increased. FIG. 12 and FIG. 13 are diagrams for illustrating the deformation of the stator 2 by the electromagnetic excitation forces of FIG. 11. The electromagnetic excitation force Force_E1 and the electromagnetic excitation force Force_E2 of FIG. 11 are not constant forces, but forces that fluctuate while being reversed in phase. Therefore, the deformation of the stator 2 is deformation in which the solid-line shape and the broken-line shape illustrated in FIG. 12 and FIG. 13 are repeated alternately.

Figure 14:
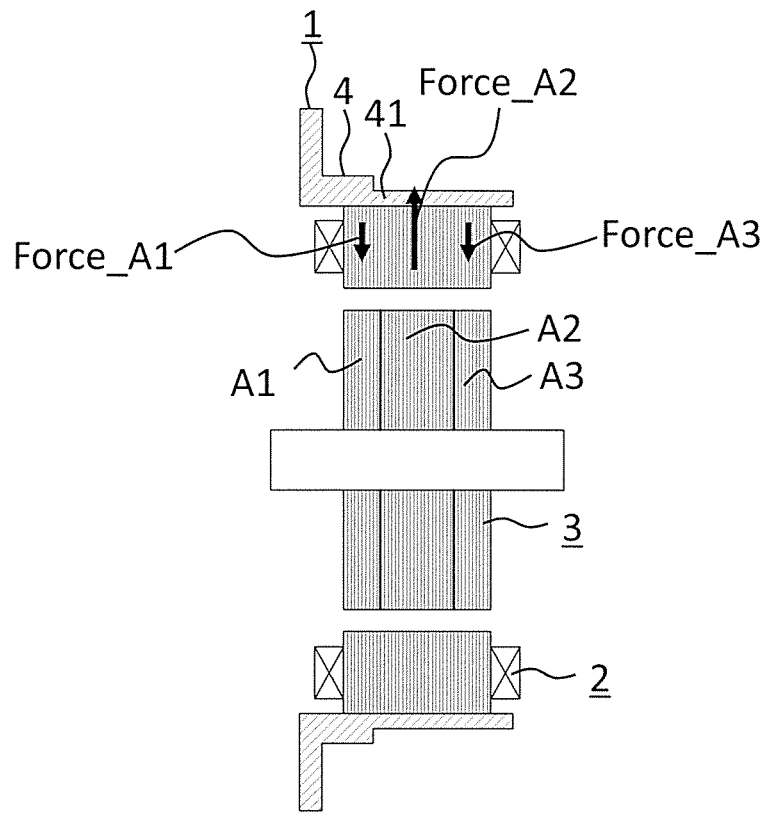
FIG. 14 is a view for illustrating electromagnetic excitation forces generated in the rotor of the rotating electric machine according to the first embodiment of the present invention.

FIG. 14 is a view for illustrating electromagnetic excitation forces generated in the rotor 3 of the rotating electric machine according to the first embodiment of the present invention. The electromagnetic excitation force of sixth-ordered electric angle generated in the first block A1 and the electromagnetic excitation force of sixth-ordered electric angle generated in the third block A3 have the same phase and the same magnitude. The magnitude of the electromagnetic excitation force of sixth-ordered electric angle generated in the second block A2 is twice the magnitude of the electromagnetic excitation force of sixth-ordered electric angle generated in each of the first block A1 and the third block A3. A phase of the electromagnetic excitation force of sixth-ordered electric angle generated in the second block A2 is shifted by 180° from a phase of the electromagnetic excitation force of sixth-ordered electric angle generated in each of the first block A1 and the third block A3. Therefore, electromagnetic excitation forces at one moment generated in the rotor 3 are as illustrated in FIG. 14.

Figure 15:
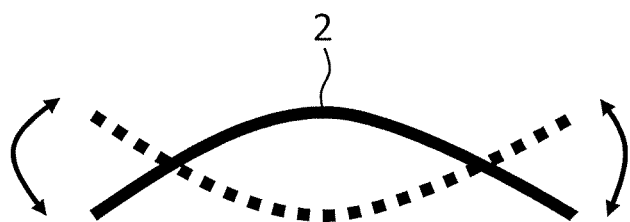
FIG. 15 is a diagram for illustrating deformation of the stator by the electromagnetic excitation forces of FIG. 14.
Figure 16:
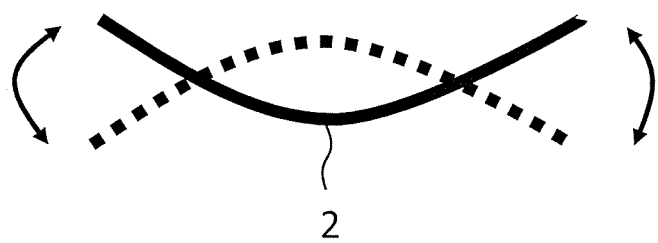
FIG. 16 is a diagram for illustrating deformation of the stator by the electromagnetic excitation forces of FIG. 14.

FIG. 15 and FIG. 16 are diagrams for illustrating deformation of the stator 2 by the electromagnetic excitation forces of FIG. 14. The electromagnetic excitation force Force_A1, the electromagnetic excitation force Force_A2, and the electromagnetic excitation force Force_A3 of FIG. 14 are not constant forces, but fluctuating forces. Further, the electromagnetic excitation force Force_A1 and the electromagnetic excitation force Force_A2 have phases that are reversed from each other, and the electromagnetic excitation force Force_A2 and the electromagnetic excitation force Force_A3 have phases that are reversed from each other. Therefore, the deformation of the stator 2 is deformation in which the solid-line shape and the broken-line shape illustrated in FIG. 15 and FIG. 16 are repeated alternately.

As illustrated in FIG. 11 to FIG. 16, a natural frequency of the deformation in the rotating electric machine according to the first embodiment becomes higher than a natural frequency of the deformation in the rotating electric machine according to the comparative example, and the rotating electric machine according to the first embodiment becomes less likely to be deformed than the rotating electric machine according to the comparative example. When the natural frequency becomes higher, and a difference between a frequency of the electromagnetic excitation forces corresponding to the rotation speed of the rotating electric machine and the natural frequency becomes larger, the oscillations and noise generated in the rotating electric machine can be reduced. Further, with the less likelihood to be deformed, even with the same magnitude of the electromagnetic excitation forces, an amount of deformation of the stator 2 is reduced. As a result, the oscillations and noise generated in the rotating electric machine can be reduced. Therefore, with the rotating electric machine according to the first embodiment, the oscillations and noise generated in the rotating electric machine can be reduced as compared to the rotating electric machine according to the comparative example. As described above, with the configuration of the rotating electric machine according to the first embodiment, the mode of deformation of the stator 2 can be changed, and the oscillations and noise generated in the rotating electric machine can be reduced.

In particular, in the rotating electric machine 1 arranged between the engine 101 and the transmission, the stator core 21 has an outer diameter of from 200 mm to 400 mm. In the rotating electric machine 1 having a large diameter, an eigenvalue with respect to mode zeroth-ordered deformation becomes smaller than the rotating electric machine 1 having a small diameter, and noise of the rotating electric machine 1 by the electromagnetic excitation force of sixth-ordered electrical angle and mode zeroth-ordered becomes a problem acoustically. In such a rotating electric machine 1, the configuration of the rotating electric machine 1 according to the first embodiment has a significant effect particularly in noise reduction.

As described above, according to the rotating electric machine 1 of the first embodiment of the present invention, the plurality of blocks 33 include the skew-angle-increasing pair of blocks and the skew-angle-decreasing pair of blocks. With this configuration, the electromagnetic excitation forces generated in the stator 2 can be reduced. As a result, the oscillations and noise generated in the rotating electric machine 1 can be reduced.

Further, the plurality of blocks 33 are three blocks, and the three blocks 33 include one skew-angle-increasing pair of blocks and one skew-angle-decreasing pair of blocks. The deformation of the stator 2 by the electromagnetic excitation forces is the deformation in which shapes of reversed phases are repeated in order in each of the skew-angle-increasing pair of blocks and the skew-angle-decreasing pair of blocks. As a result, even with the same magnitude of the electromagnetic excitation forces, the amount of deformation of the stator 2 can be reduced. Consequently, the oscillation and noise generated in the rotating electric machine can be reduced.

Further, the rotary shaft 5 is provided on the same axis as that of the crank shaft of the engine 101, and the frame 4 is cantilevered to the housing 103, which is provided between the engine 101 and the transmission 102. When the electromagnetic excitation forces generated in the stator 2 are reduced, the electromagnetic excitation forces generated in the stator 2 are prevented from being transmitted to the engine 101.

Second Embodiment

Figure 17:
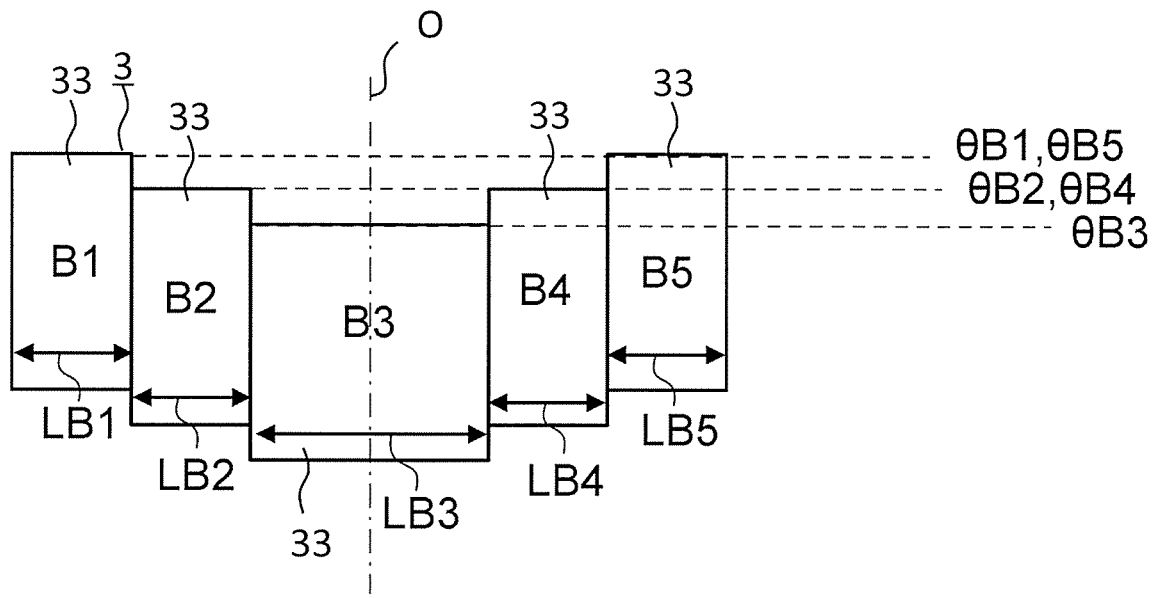
FIG. 17 is a diagram for illustrating a rotor of a rotating electric machine according to a second embodiment of the present invention.

FIG. 17 is a diagram for illustrating a rotor of a rotating electric machine according to a second embodiment of the present invention. In the second embodiment, a rotor 3 is divided into five blocks 33 in the axial direction. The five blocks 33 are defined as a first block B1, a second block B2, a third block B3, a fourth block B4, and a fifth block B5 in order from one end to the other end of the rotor 3 in the axial direction. FIG. shows shift angles of the five blocks 33 in the circumferential direction.

A length of the first block B1 in the axial direction is represented by LB1. A length of the second block B2 in the axial direction is represented by LB2. A length of the third block B3 in the axial direction is represented by LB3. A length of the fourth block B4 in the axial direction is represented by LB4. A length of the fifth block B5 in the axial direction is represented by LB5. In this example, LB1=LB2=LB4=LB5, and LB3=2×LB1.

The first block B1 and the second block B2 are arranged to be shifted from each other in the circumferential direction. The second block B2 and the third block B3 are arranged to be shifted from each other in the circumferential direction. The third block B3 and the fourth block B4 are arranged to be shifted from each other in the circumferential direction. The fourth block B4 and the fifth block B5 are arranged to be shifted from each other in the circumferential direction.

Specifically, the second block B2 is arranged to be shifted from the first block B1 in the first direction of the circumferential direction, and the third block B3 is arranged to be shifted from the second block B2 in the first direction of the circumferential direction. Further, the fourth block B4 is arranged to be shifted from the third block B3 in the second direction of the circumferential direction, and the fifth block B5 is arranged to be shifted from the fourth block B4 in the second direction of the circumferential direction.

The first block B1 and the second block B2 are a skew-angle-increasing pair of blocks, and the second block B2 and the third block B3 are another skew-angle-increasing pair of blocks. The third block A3 and the fourth block A4 are a skew-angle-decreasing pair of blocks, and the fourth block A4 and the fifth block A5 are another skew-angle-decreasing pair of blocks. The five blocks 33 include two skew-angle-increasing pairs of blocks and two skew-angle-decreasing pairs of blocks.

A shift angle of the first block B1 with respect to a reference position of the blocks 33 in the circumferential direction is represented by θB1. A shift angle of the second block B2 with respect to the reference position of the blocks 33 in the circumferential direction is represented by θB2. A shift angle of the third block B3 with respect to the reference position of the blocks 33 in the circumferential direction is represented by θB3. A shift angle of the fourth block B4 with respect to the reference position of the blocks 33 in the circumferential direction is represented by θB4. A shift angle of the fifth block B5 with respect to the reference position of the blocks 33 in the circumferential direction is represented by θB5.

In the second embodiment, the position of the first block B1 and the position of the fifth block B5 are the reference position of the blocks 33. Therefore, θB1=θB5=0°. The second block B2 and the fourth block B4 are shifted by 20° from the reference position of the blocks 33 in the circumferential direction. Therefore, θB2=θB4=20°. The third block B3 is shifted by 40° from the reference position of the blocks 33 in the circumferential direction. Therefore, θB3=40°. Here, the shift angle θB1, the shift angle θB2, the shift angle θB3, the shift angle θB4, and the shift angle θB5 are electrical angles. In this example, θB1=θB5=0°. However, the present invention is not limited thereto, and the shift angle θB1 and the shift angle θB5 may be another angle. Also in this case, the shift angle θB2 and the shift angle θB4 are shifted by 20° from the shift angle θB1 and the shift angle θB5, and the shift angle θB3 is shifted by 40° from the shift angle θB1 and the shift angle θB5.

Figure 18:
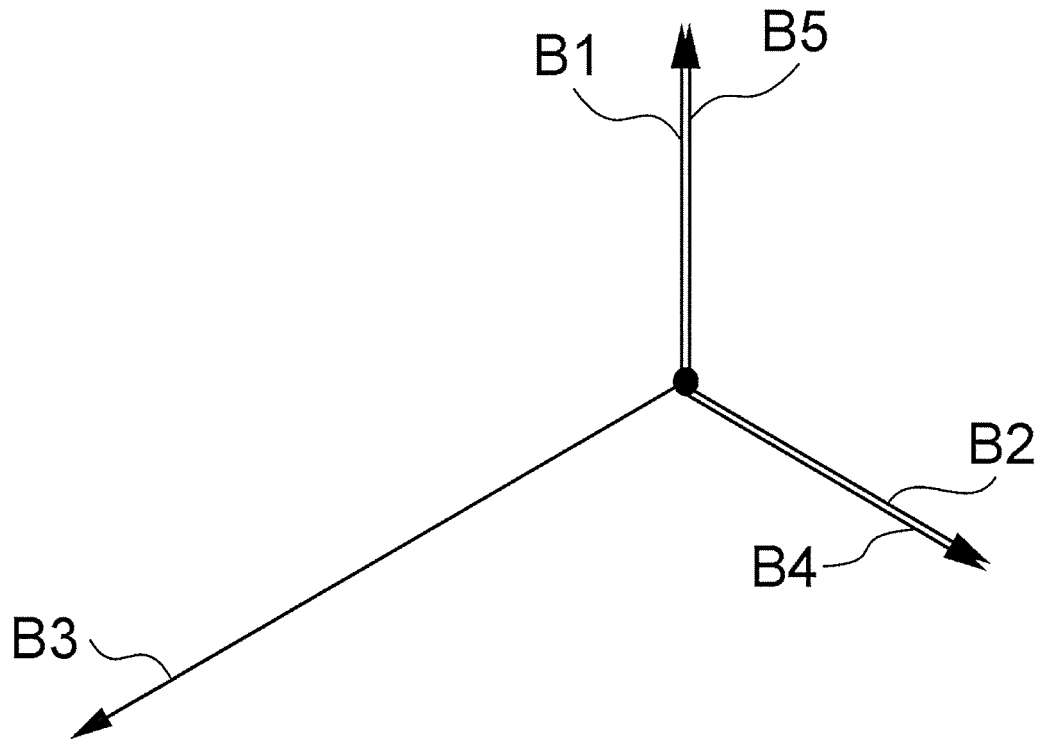
FIG. 18 is a diagram for illustrating electromagnetic excitation forces of sixth-ordered electric angle generated in respective blocks of FIG. 17.

FIG. 18 is a diagram for illustrating electromagnetic excitation forces of sixth-ordered electric angle generated in the respective blocks 33 of FIG. 17. The electromagnetic excitation forces of sixth-ordered electric angle generated in the rotor 3 are electromagnetic excitation forces having a period of 60° in electrical angle. Therefore, the electromagnetic excitation forces of sixth-ordered electric angle generated in the first block B1 and the second block B2, which are shifted by 20° in electrical angle from each other, have a phase difference of 120°. Similarly, the electromagnetic excitation forces of sixth-ordered electric angle generated in the fourth block B4 and the fifth block B5, which are shifted by 20° in electrical angle, have a phase difference of 120°.

The electromagnetic excitation forces of sixth-ordered electric angle generated in the first block B1 and the third block B3, which are shifted by 40° in electrical angle from each other, have a phase difference of 240°. Similarly, the electromagnetic excitation forces of sixth-ordered electric angle generated in the third block B3 and the fifth block B5, which are shifted by 40° in electrical angle, have a phase difference of 240°.

Magnitudes of the electromagnetic excitation forces of sixth-ordered electric angle generated in the respective blocks 33 are proportional to the lengths of the blocks 33 in the axial direction. FIG. 18 shows angles and the magnitudes of the electromagnetic excitation forces of sixth-ordered electric angle generated in the first block B1, the second block B2, and the third block B3, the fourth block B4, and the fifth block B5 through use of vectors.

The electromagnetic excitation force of sixth-ordered electric angle generated in the first block B1, the electromagnetic excitation force of sixth-ordered electric angle generated in the second block B2, the electromagnetic excitation force of sixth-ordered electric angle generated in the fourth block B4, and the electromagnetic excitation force of sixth-ordered electric angle generated in the fifth block B5 have the same magnitude. The magnitude of the electromagnetic excitation force of sixth-ordered electric angle generated in the third block B3 is twice the magnitude of the electromagnetic excitation force of sixth-ordered electric angle generated in the first block B1.

The electromagnetic excitation force of sixth-ordered electric angle generated in the first block B1 and the electromagnetic excitation force of sixth-ordered electric angle generated in the fifth block B5 have the same phase. The electromagnetic excitation force of sixth-ordered electric angle generated in the second block B2 and the electromagnetic excitation force of sixth-ordered electric angle generated in the fourth block B4 have the same phase. The phase of the electromagnetic excitation force of sixth-ordered electric angle generated in the first block B1 is shifted by 120° from the phase of the electromagnetic excitation force of sixth-ordered electric angle generated in the second block B2. The phase of the electromagnetic excitation force of sixth-ordered electric angle generated in the first block B1 is shifted by 240° from the phase of the electromagnetic excitation force of sixth-ordered electric angle generated in the third block B3. As illustrated in FIG. 18, a sum of vectors indicating the electromagnetic excitation forces of sixth-ordered electric angle generated in the first block B1, the second block B2, the third block B3, the fourth block B4, and the fifth block B5 is a zero vector. Therefore, the electromagnetic excitation forces of sixth-ordered electric angle generated in the first block B1, the second block B2, the third block B3, the fourth block B4, and the fifth block B5 are cancelled out. As a result, the electromagnetic excitation forces of sixth-ordered electric angle are reduced.

As illustrated in FIG. 17, in a portion of the rotor 3 on one side of the center plane O in the axial direction, a sum of vectors indicating generated electromagnetic excitation forces of sixth-ordered electric angle is a zero vector. Also in a portion of the rotor 3 on the other side of the center plane O in the axial direction, a sum of vectors indicating generated electromagnetic excitation forces of sixth-ordered electric angle is a zero vector.

In other words, between the portion of the rotor 3 on the one side of the center plane O in the axial direction and the portion of the rotor 3 on the other side of the center plane O in the axial direction, the generated electromagnetic excitation forces of sixth-ordered electric angle match. As a result, oscillations of the rotating electric machine 1 are further suppressed.

As described above, according to the rotating electric machine 1 of the second embodiment of the present invention, the plurality of blocks 33 are five blocks, and the five blocks 33 include two skew-angle-increasing pairs of blocks and two skew-angle-decreasing pairs of blocks. With this configuration, the noise generated in the rotating electric machine 1 can be reduced.

In the second embodiment, the rotor core 31 in which the third block B3 is formed of one block has been described. However, a rotor core 31 in which the third block B3 is formed of two blocks 33 may be adopted. In this case, a shift angle of each of the two blocks 33 forming the third block B3 is θB3. In this case, all the blocks 33 forming the rotor core 31 may have the same length in the axial direction. With this configuration, a manufacturing facility configured to manufacture the rotor core 31 can be simplified, and parts forming the rotor core 31 can be made common. As a result, a manufacturing cost of the rotor core 31 can be reduced.

Third Embodiment

Figure 19:
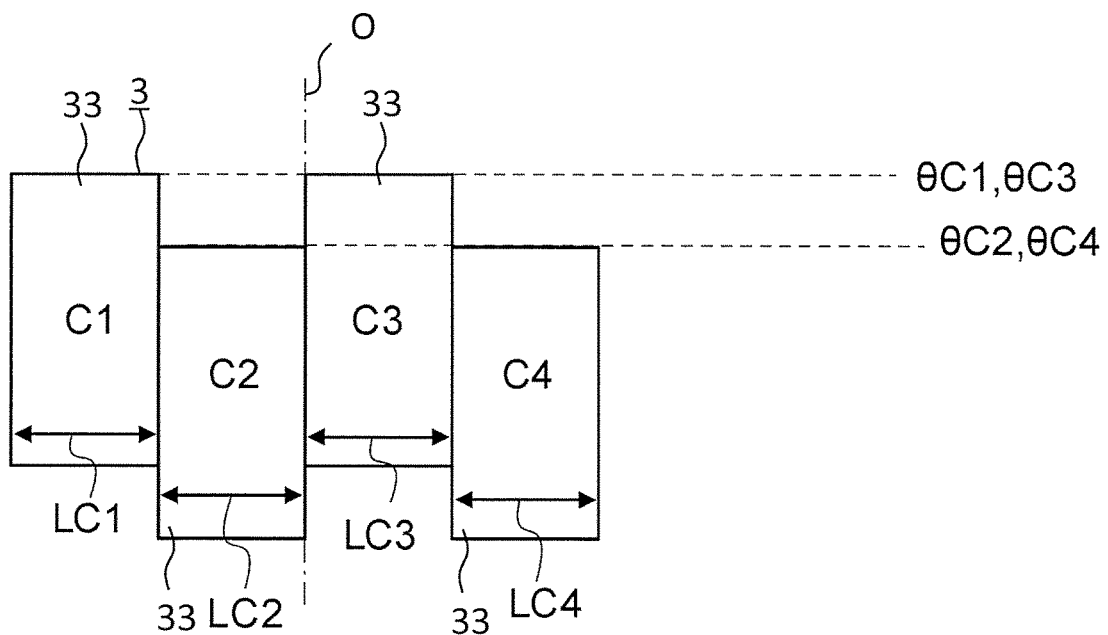
FIG. 19 is a diagram for illustrating a rotor of a rotating electric machine according to a third embodiment of the present invention.

FIG. 19 is a diagram for illustrating a rotor of a rotating electric machine according to a third embodiment of the present invention. In the third embodiment, a rotor 3 is divided into four blocks 33 in the axial direction. The four blocks 33 are defined as a first block C1, a second block C2, a third block C3, and a fourth block C4 in order from one end to the other end of the rotor 3 in the axial direction. FIG. 19 shows shift angles of the four blocks 33 in the circumferential direction.

A length of the first block C1 in the axial direction is represented by LC1. A length of the second block C2 in the axial direction is represented by LC2. A length of the third block C3 in the axial direction is represented by LC3. A length of the fourth block C4 in the axial direction is represented by LC4. In this example, LC1=LC2=LC3=LC4.

The first block C1 and the second block C2 are arranged to be shifted from each other in the circumferential direction. The second block C2 and the third block C3 are arranged to be shifted from each other in the circumferential direction. The third block C3 and the fourth block C4 are arranged to be shifted from each other in the circumferential direction.

Specifically, the second block C2 is arranged to be shifted from the first block C1 in the first direction of the circumferential direction. The third block C3 is arranged to be shifted from the second block C2 in the second direction of the circumferential direction. The fourth block C4 is arranged to be shifted from the third block C3 in the first direction of the circumferential direction.

The first block C1 and the second block C2 are a skew-angle-increasing pair of blocks, and the second block C2 and the third block C3 are a skew-angle-decreasing pair of blocks. The third block C3 and the fourth block C4 are another skew-angle-increasing pair of blocks. The four blocks 33 include two skew-angle-increasing pairs of blocks and one skew-angle-decreasing pair of blocks. It is only required that the plurality of blocks 33 include at least one of a plurality of skew-angle-increasing pairs of blocks and a plurality of skew-angle-decreasing pairs of blocks from the one end to the other end of the rotor 3 in the axial direction.

A shift angle of the first block C1 with respect to a reference position of the blocks 33 in the circumferential direction is represented by θC1. A shift angle of the second block C2 with respect to the reference position of the blocks 33 in the circumferential direction is represented by θC2. A shift angle of the third block C3 with respect to the reference position of the blocks 33 in the circumferential direction is represented by θC3. A shift angle of the fourth block C4 with respect to the reference position of the blocks 33 in the circumferential direction is represented by θC4.

In the third embodiment, the position of the first block C1 and the position of the third block C3 are the reference position of the blocks 33. Therefore, θC1=θC3=0°. The second block C2 and the fourth block C4 are shifted by 30° from the reference position of the blocks 33 in the circumferential direction. Therefore, θC2=θC4=30°. Here, the shift angle θC1, the shift angle θC2, the shift angle θC3, and the shift angle θC4 are electrical angles. In this example, θC1=θC3=0°. However, the present invention is not limited thereto, and the shift angle θC1 and the shift angle θC3 may be another angle. Also in this case, the shift angle θC2 and the shift angle θC4 are shifted by 30° from the shift angle θC1 and the shift angle θC3.

Figure 20:
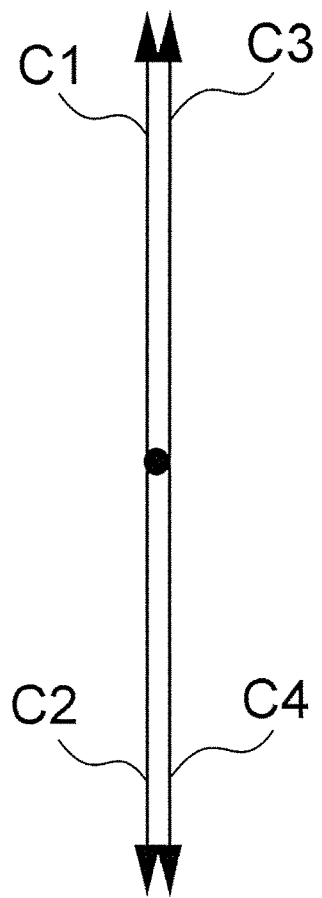
FIG. 20 is a diagram for illustrating electromagnetic excitation forces of sixth-ordered electric angle generated in respective blocks of FIG. 19.

FIG. 20 is a diagram for illustrating electromagnetic excitation forces of sixth-ordered electric angle generated in the respective blocks 33 of FIG. 19. The electromagnetic excitation forces of sixth-ordered electric angle generated in the rotor 3 are electromagnetic excitation forces having a period of 60° in electrical angle. Therefore, the electromagnetic excitation forces of sixth-ordered electric angle generated in the first block C1 and the second block C2, which are shifted by 30° in electrical angle from each other, have a phase difference of 180°. Similarly, the electromagnetic excitation forces of sixth-ordered electric angle generated in the third block C3 and the fourth block C4, which are shifted by 30° in electrical angle, have a phase difference of 180°.

Magnitudes of the electromagnetic excitation forces of sixth-ordered electric angle generated in the respective blocks 33 are proportional to the lengths of the blocks 33 in the axial direction. FIG. 20 shows angles and the magnitudes of the electromagnetic excitation forces of sixth-ordered electric angle generated in the first block C1, the second block C2, and the third block C3, and the fourth block C4 through use of vectors.

The electromagnetic excitation force of sixth-ordered electric angle generated in the first block C1, the electromagnetic excitation force of sixth-ordered electric angle generated in the second block C2, the electromagnetic excitation force of sixth-ordered electric angle generated in the third block C3, and the electromagnetic excitation force of sixth-ordered electric angle generated in the fourth block C4 have the same magnitude.

The electromagnetic excitation force of sixth-ordered electric angle generated in the first block C1 and the electromagnetic excitation force of sixth-ordered electric angle generated in the third block C3 have the same phase. The electromagnetic excitation force of sixth-ordered electric angle generated in the second block C2 and the electromagnetic excitation force of sixth-ordered electric angle generated in the fourth block C4 have the same phase. The phase of the electromagnetic excitation force of sixth-ordered electric angle generated in the first block C1 is shifted by 180° from the phase of the electromagnetic excitation force of sixth-ordered electric angle generated in the second block C2. As illustrated in FIG. 20, a sum of vectors indicating the electromagnetic excitation forces of sixth-ordered electric angle generated in the first block C1, the second block C2, the third block C3, and the fourth block C4 is a zero vector. Therefore, the electromagnetic excitation forces of sixth-ordered electric angle generated in the first block C1, the second block C2, the third block C3, and the fourth block C4 are cancelled out. As a result, the electromagnetic excitation forces of sixth-ordered electric angle are reduced.

As illustrated in FIG. 19, in a portion of the rotor 3 on one side of the center plane O in the axial direction, a sum of vectors indicating generated electromagnetic excitation forces of sixth-ordered electric angle is a zero vector. Similarly, in a portion of the rotor 3 on the other side of the center plane O in the axial direction, a sum of vectors indicating generated electromagnetic excitation forces of sixth-ordered electric angle is a zero vector.

In other words, between the portion of the rotor 3 on the one side of the center plane O in the axial direction and the portion of the rotor 3 on the other side of the center plane O in the axial direction, the generated electromagnetic excitation forces of sixth-ordered electric angle match. As a result, oscillations of the rotating electric machine 1 are further suppressed. Other configurations are the same as those in the first embodiment and the second embodiment.

As described above, according to the rotating electric machine 1 of the third embodiment of the present invention, the plurality of blocks 33 are four blocks, and the four blocks 33 include two skew-angle-increasing pairs of blocks and one skew-angle-decreasing pair of blocks. With this configuration, the noise generated in the rotating electric machine 1 can be reduced.

Fourth Embodiment

Figure 21:
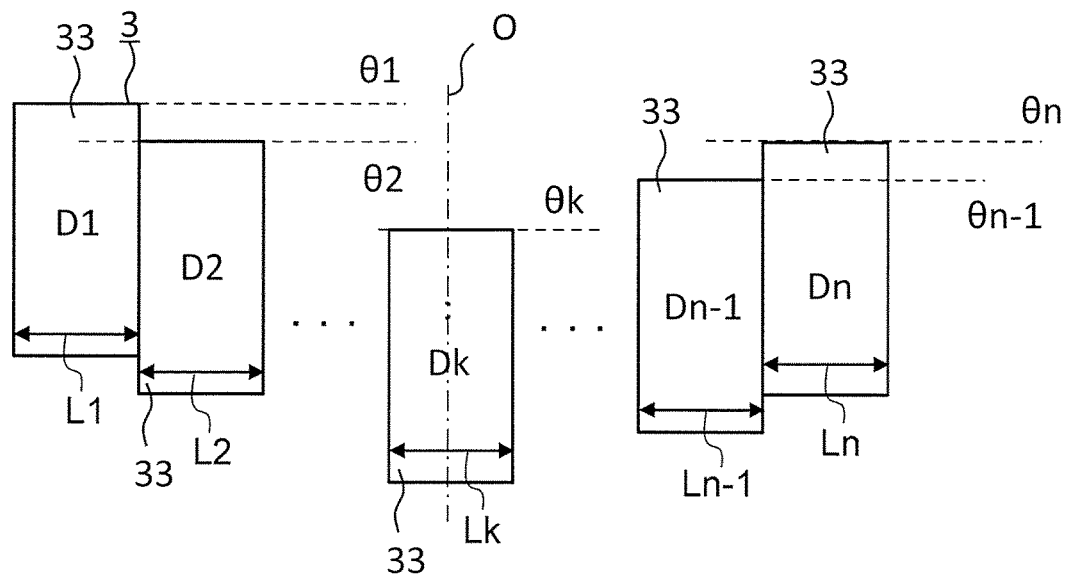
FIG. 21 is a diagram for illustrating a rotor of a rotating electric machine according to a fourth embodiment of the present invention.

FIG. 21 is a diagram for illustrating a rotor of a rotating electric machine according to a fourth embodiment of the present invention. In the fourth embodiment, a rotor 3 is divided into n blocks 33 in the axial direction. The n blocks 33 are defined as a first block D1 to an n-th block Dn in order from one end to the other end of the rotor 3 in the axial direction. FIG. 21 shows shift angles of the n blocks 33 in the circumferential direction.

Lengths of the first block D1 to the n-th block Dn in the axial direction are represented by LD1 to LDn. The length LD1 to the length LDn are the same. Of the blocks 33 from the first block D1 to the n-th block Dn, each pair of adjacent blocks 33 are arranged to be shifted from each other in the circumferential direction.

Shift angles of the first block D1 to the n-th block Dn from the reference position of the blocks 33 in the circumferential direction are represented by θ1 to θn. The shift angle θ1 to the shift angle θn are electrical angles. A natural number in a range of from 1 to n is represented by k. A k-th block Dk is a k-th block 33 of the plurality of blocks 33, which is counted from the one end in the axial direction. A vector Fk of an electromagnetic excitation force of sixth-ordered electric angle generated in the k-th block Dk is expressed by a complex expression (1) provided below. In the expression (1), j is an imaginary unit.

$$F_k = L_k e^{j6\theta_k} \tag{1}$$

In the above expression (1), phases of the blocks 33 and lengths of the blocks 33 in the axial direction are taken into consideration.

A sum Ftotal of vectors of electromagnetic excitation forces of sixth-ordered electric angle generated in the first block D1 to the n-th block Dn is expressed by the following expression (2).

$$F_{total} = \sum_{k=1}^{n} L_k e^{j6\theta_k} \tag{2}$$

In order to make the above-mentioned expression (2) dimensionless, a sum Fnormal of vectors normalized by the number of plurality of blocks 33 and the lengths in the axial direction is a complex vector expressed by the following expression (3).

$$F_{normal} = \frac{1}{L_c} \sum_{k=1}^{n} L_k e^{j6\theta_k} \tag{3}$$

In the expression (3), Lc represents a length of the rotor 3 in the axial direction, and is a sum of the length L1 to the length Ln. When the rotor 3 is formed so that a magnitude of the sum Fnormal of vectors becomes 0, the electromagnetic excitation forces of sixth-ordered electric angle generated in the rotor 3 are cancelled out. As a result, the electromagnetic excitation forces of sixth-ordered electric angle are reduced.

Figure 22:
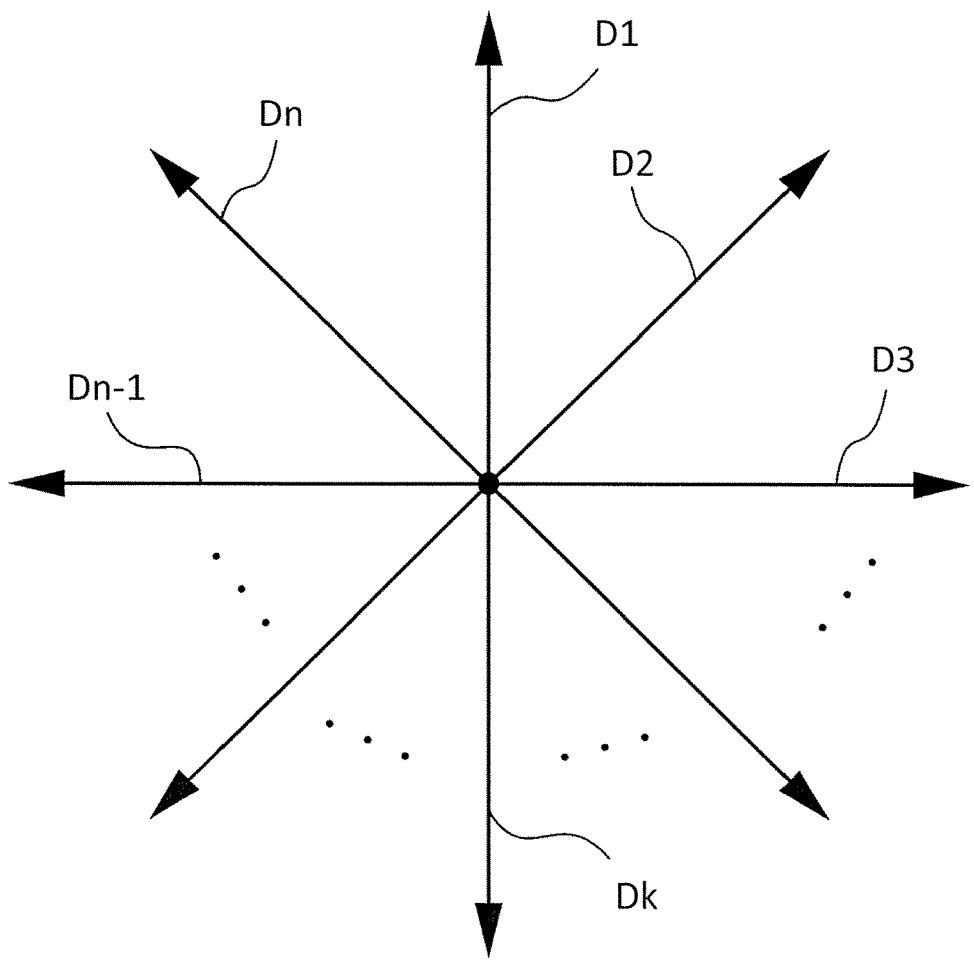
FIG. 22 is a diagram for illustrating electromagnetic excitation forces of sixth-ordered electric angle generated in respective blocks of FIG. 21.

FIG. 22 is a diagram for illustrating electromagnetic excitation forces of sixth-ordered electric angle generated in the respective blocks 33 of FIG. 21. When the shift angles of the first block D1 to the n-th block Dn with respect to the reference position of the blocks 33 are the same, in other words, when the shift angle θ1 to the shift angle θn are each 0, the sum Fnormal of vectors takes a value of 1. When the value of the sum Fnormal of vectors is 0.5 or less, the electromagnetic excitation forces of sixth-ordered electric angle generated in the rotor 3 becomes about a half. The value of the sum Fnormal of vectors is more desirably 0.1 or less.

As illustrated in FIG. 21, in a portion of the rotor 3 on one side of the center plane O in the axial direction, a sum of vectors indicating generated electromagnetic excitation forces of sixth-ordered electric angle is a zero vector. Also in a portion of the rotor 3 on the other side of the center plane O in the axial direction, a sum of vectors indicating generated electromagnetic excitation forces of sixth-ordered electric angle is a zero vector.

In other words, between the portion of the rotor 3 on the one side of the center plane O in the axial direction and the portion of the rotor 3 on the other side of the center plane O in the axial direction, the generated electromagnetic excitation forces of sixth-ordered electric angle match. As a result, oscillations of the rotating electric machine 1 are further suppressed. Other configurations are the same as those in the first embodiment, the second embodiment, and the third embodiment.

As described above, according to the rotating electric machine of the fourth embodiment of the present invention, the value of the sum Fnormal of vectors expressed by the above-mentioned expression (3) is 0.5 or less. With this configuration, the oscillations and noise generated in the rotating electric machine can be reduced.

In the fourth embodiment, the shift angles of the first block D1 to the k-th block Dk with respect to the reference position of the blocks 33 are monotonously increased, and the shift angles of the k-th block Dk to the n-th block Dn with respect to the reference position of the blocks 33 are monotonously decreased. However, the monotonous increase and the monotonous decrease of the shift angles of the first block D1 to the n-th block Dn with respect to the reference position of the blocks 33 may each be repeated a plurality of times.

What is claimed is:

1. A rotating electric machine, comprising:
   a stator;
   a rotor provided to be opposed to the stator; and
   a frame configured to hold the stator,
   the rotor including:
      a rotor core; and
      a plurality of permanent magnets, which are provided in the rotor core, and are arranged in a circumferential direction of the rotor,
   the rotor being divided into a plurality of blocks in an axial direction of the rotor,
   the plurality of blocks including:
      a skew-angle-increasing pair of blocks, which are a pair of blocks of the plurality of blocks that are adjacent to and shifted from each other in a first direction of the circumferential direction of the rotor from one end to another end of the rotor in the axial direction of the rotor; and
      a skew-angle-decreasing pair of blocks, which are a pair of blocks of the plurality of blocks that are adjacent to and shifted from each other in a second direction, which is an opposite direction from the first direction, of the circumferential direction of the rotor from the one end to the another end of the rotor in the axial direction of the rotor,
   the frame including:
      a body portion, which is formed into a cylindrical shape, and is configured to hold the stator; and
      a flange portion, which is provided at an end of the body portion in an axial direction of the body portion, and projects outward from the body portion in a radial direction of the body portion,
   the body portion facing the stator has a thickness that changes from one end to another end of the body portion in the axial direction of the body portion, wherein a shift angle of the skew-angle-increasing pair of blocks in the first direction is equal to a shift angle of the skew-angle-decreasing pair of blocks in the second direction, wherein the plurality of blocks are three blocks, wherein the three blocks include one skew-angle-increasing pair of blocks and one skew-angle-decreasing pair of blocks as the skew-angle-increasing pair of blocks and the skew-angle-decreasing pair of blocks from the one end to the another end of the rotor in the axial direction of the rotor, wherein the plurality of blocks include a first block, a second block and a third block, which are arranged in the axial direction, wherein LA1=LA3 and LA2=2×LA1 are satisfied, where LA1 represents a length of the first block in the axial direction, LA2 represents a length of the second block in the axial direction, and LA3 represents a length of the third block in the axial direction, and wherein θA1=θA3 is satisfied, and θA2 is shifted by 30° from θA1 and θA3, where θA1 represents a shift angle of the first block with respect to a reference position of the plurality of blocks in the circumferential direction, θA2 represents a shift angle of the second block with respect to the reference position of the plurality of blocks in the circumferential direction, and θA3 represents a shift angle of the third block with respect to the reference position of the plurality of blocks in the circumferential direction, wherein first electromagnetic excitation forces of sixth-ordered electric angle generated in the first block and second electromagnetic excitation forces of sixth-ordered electric angle generated in the second block have a phase difference of 180°, the second electromagnetic excitation forces of the second block and third electromagnetic excitation forces of sixth-ordered electric angle generated in the third block have a phase difference of 180°, such that a cumulative effect for the first block, the second block and the third block is a total electromagnetic excitation force of sixth-ordered electric angle equal to approximately zero electromagnetic excitation force.

2. The rotating electric machine according to claim 1, wherein N:M=2:3 is satisfied, where N represents the number of poles of the rotor, and M represents the number of slots of the stator, and wherein a complex vector expressed by the following expression has a magnitude of 0.5 or less:

$$F_{normal} = \frac{1}{L_c}\sum_{k=1}^{n} L_k e^{j6\theta k} \quad (1)$$

where Lc represents a length of the rotor in the axial direction of the rotor, n represents the number of blocks being the plurality of blocks, Lk represents a length of a k-th block of the plurality of blocks, which is counted from the one end of the plurality of blocks in the axial direction of the rotor, in the axial direction of the rotor, θk represents a shift angle in electrical angle of the k-th block with respect to a reference position of the plurality of blocks in the circumferential direction of the rotor, and j represents an imaginary unit.

3. The rotating electric machine according to claim 2, wherein n=3, and wherein the following relationships are satisfied: L1=L3, L2=2×L1, θ1<θ2, and θ2>θ3.

4. The rotating electric machine according to claim 1, wherein the plurality of blocks include at least one of a plurality of the skew-angle-increasing pairs of blocks and a plurality of the skew-angle-decreasing pairs of blocks from the one end to the another end of the rotor in the axial direction of the rotor.

5. The rotating electric machine according to claim 1, wherein the plurality of blocks each have the same length in the axial direction of the rotor.

6. The rotating electric machine according to claim 1, wherein the flange portion is provided at only the one end of the body portion in the axial direction of the body portion, and is fixed to a mounting target member, and wherein the stator is fitted to the body portion.

7. The rotating electric machine according to claim 1, further comprising a rotary shaft configured to support the rotor, wherein the rotary shaft is provided on the same axis as an axis of a crank shaft of an engine, and wherein the frame is cantilevered to a housing, which is provided between the engine and a transmission.

8. The rotating electric machine according to claim 7, wherein the rotary shaft is directly connected to the crank shaft.

9. The rotating electric machine according to claim 7, wherein the rotary shaft is connected to the crank shaft via a transmission system, which is provided to the crank shaft.

10. The rotating electric machine according to claim 1, wherein the first electromagnetic excitation forces of sixth-ordered electric angle generated in the first block and the third electromagnetic excitation forces of sixth-ordered electric angle generated in the third block have the same phase and the same magnitude, and wherein the magnitude of the second electromagnetic excitation forces of sixth-ordered electric angel generated in the second block is twice the magnitude of the first electromagnetic excitation forces of sixth-ordered electric angle and the third electromagnetic excitation forces of sixth-ordered electric angle.

11. The rotating electric machine of claim 1, wherein the rotor is configured with two poles and the stator is configured with three slots, and wherein a natural frequency of stator vibration becomes higher due to the configuration of the first block, the second block and the third block, and oscillations and noise generated in the rotating machine are thereby reduced.

12. The rotating electric machine according to claim 1, wherein a plane that is perpendicular to the axial direction and passes through a center of the rotor in the axial direction is defined as a center plane, wherein in a portion of the rotor on one side of the center plane in the axial direction, a sum of the electromagnetic excitation forces of sixth-ordered electric angle is zero, and wherein in a portion of the rotor on the other side of the center plane in the axial direction, a sum of the electromagnetic excitation forces of sixth-ordered electric angle is zero.

13. The rotating electric machine according to claim 1, wherein the flange portion is provided at only the one end of the body portion in the axial direction of the body portion, and is not fixed to a mounting target member.

* * * * *